United States Patent
Ouyang et al.

(10) Patent No.: US 10,257,240 B2
(45) Date of Patent: Apr. 9, 2019

(54) ONLINE MEETING COMPUTER WITH IMPROVED NOISE MANAGEMENT LOGIC

(71) Applicant: Cisco Technology, Inc., San Jose, CA (US)

(72) Inventors: Hua Ouyang, Suzhou (CN); Huahua Yin, Suzhou (CN); Qi Shi, Suzhou (CN); Yunwei Luo, Suzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 589 days.

(21) Appl. No.: 14/546,651

(22) Filed: Nov. 18, 2014

(65) Prior Publication Data

US 2016/0142451 A1    May 19, 2016

(51) Int. Cl.
*H04L 29/06* (2006.01)
*H04L 29/08* (2006.01)

(52) U.S. Cl.
CPC .......... *H04L 65/403* (2013.01); *H04L 65/605* (2013.01); *H04L 65/80* (2013.01); *H04L 67/42* (2013.01)

(58) Field of Classification Search
CPC ..... H04M 3/568; H04M 9/08; H04M 2250/62
See application file for complete search history.

(56) References Cited

U.S. PATENT DOCUMENTS

| | | | |
|---|---|---|---|
| 2003/0005462 A1* | 1/2003 | Broadus | H04N 7/147 725/110 |
| 2010/0092000 A1* | 4/2010 | Kim | G10L 21/0208 381/58 |
| 2010/0103776 A1* | 4/2010 | Chan | G01S 11/14 367/119 |
| 2011/0214554 A1* | 9/2011 | Nakadai | G09B 15/02 84/477 R |

(Continued)

OTHER PUBLICATIONS

NextHop, "Voice Quality Improvements in Lync Server 2010", TechNet Blogs dated Apr. 4, 2011, 6 pages.

*Primary Examiner* — Sang H Kim
(74) *Attorney, Agent, or Firm* — Hickman Palermo Becker Bingham LLP (57) ABSTRACT

In an embodiment, a method for calculating a noise index value for a digital audio source in a server computer system that is coupled to a plurality of audio sources and configured to operate a teleconference among the plurality of digital audio sources comprises receiving a first digital audio signal from the digital audio source of the one or more digital sources. Using the server computer system, the process identifies two or more types of sounds that are represented in the first digital audio source. The types of sounds identified include at least two of: one or more human voices; a background noise; or an actionable sound that mandates further action. Using a server computer system, calculating the noise index value based upon the types of sounds identified from the first digital audio signal. The noise index value represents a summation of relative magnitudes particular types of sounds that has been identified in the first digital audio signal in relation to other types of sounds that have been identified in the first digital audio signal. The process then visually presents the noise index value to one or more client computers of the one or more digital audio sources in a user interface screen display of an audio conference manager that the one or more client computers execute.

20 Claims, 6 Drawing Sheets

(56) References Cited

U.S. PATENT DOCUMENTS

| | | | |
|---|---|---|---|
| 2012/0076287 A1* | 3/2012 | Ramalingam | H04B 3/23 |
| | | | 379/202.01 |
| 2013/0006622 A1* | 1/2013 | Khalil | G10L 19/012 |
| | | | 704/233 |
| 2015/0030149 A1* | 1/2015 | Chu | H04M 3/568 |
| | | | 379/202.01 |

* cited by examiner

ONLINE MEETING COMPUTER WITH
IMPROVED NOISE MANAGEMENT LOGIC

TECHNICAL FIELD

The present disclosure generally relates to noise management in a computer system hosting an online teleconference system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Teleconference systems bring multiple parties together from remote locations. There are a number of teleconference solutions for enabling participants to conduct live meetings, conferences, presentations, or other types of gatherings using the Internet, the public switched telephone network (PSTN), or other voice and data networks. Participants use a telephone, computer, or other communication device that connects to a conference system. The meetings include an audio component and a visual component, such as, a shared presentation, video, online whiteboard, or other multimedia. These types of convenient teleconference solutions have become an indispensable form of communication for businesses and individuals.

Teleconference systems that incorporate both an audio and video component may utilize one or more servers. One server, such as a PSTN server, may be responsible for connecting each participant to a single shared phone line. Another server, such as an online meeting server, may be responsible for delivering visual content to each participant's computer or other client device. The PSTN server may also communicate with the online meeting server to communicate which participants are connected to the audio conference. By doing so, the meeting server is able to deliver to a participant's computing device, the status of each participant for the purposes of keeping track of active participants.

Online teleconferences require that each participant receive both the audio and video communication at an acceptable level of quality in order to sufficiently understand what the speaker is trying to say.

DESCRIPTION OF EXAMPLE EMBODIMENTS

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Embodiments are described herein according to the following outline:

1.0 General Overview
2.0 Structural and Functional Overview
3.0 noise index engine
   3.1 Determining the noise index value
   3.2 Categorizing the noise index value
   3.3 Presentation of the noise index value
4.0 Implementation Mechanisms—Hardware Overview
5.0 Extensions and Alternatives
1.0 General Overview In an embodiment, a method for calculating a noise index value for a digital audio source in a server computer system that is coupled to a plurality of audio sources and configured to operate a teleconference among the plurality of digital audio sources, comprises receiving a first digital audio signal from the digital audio source of the one or more digital sources. Using the server computer system, identifying two or more types of sounds that are represented in the first digital audio source. The types of sounds identified include at least two of: one or more human voices; a background noise; or an actionable sound that mandates further action. The process uses a server computer system, to calculate the noise index value based upon the types of sounds identified from the first audio. The noise index value represents a summation of relative magnitudes of particular types of sounds that has been identified in the first digital audio signal in relation to other types of sounds that have been identified in the first digital audio signal. The method may then visually present the noise index value to one or more client computers of the one or more digital audio sources in a user interface screen display of an audio conference manager that the one or more client computers execute. In other embodiments, the invention encompasses a computer apparatus such as an online meeting computer with improved management logic and a computer-readable medium configured to carry out the foregoing steps.

Embodiments may be used with teleconferencing technology such as online conferencing systems. CISCO WEBEX technology, commercially available from Cisco Systems, Inc., is one example of teleconferencing technology, but embodiments may be used in many other contexts and use with Cisco WebEx systems is not required.

Teleconference technologies geared towards improving sound quality focus on minimizing unwanted background noises of a speaking participant while enhancing the participant's voice communication. However, noise reduction of other listening participants is also desired. This situation may become problematic when a teleconference involves a large number of participants. In such cases, by not being able to identify the origin of the unwanted background noise, a teleconference host may be forced to interrupt the teleconference and ask the participants to either check their connections for unwanted background noise, or mute the participants' lines in order to stop the unwanted background noises.

Noise in the context of an online teleconference is not limited to background noises. Noise may be a sound that is either loud or unpleasant and causes a disturbance to the ongoing communication during the teleconference. Or, noise may be any unwanted sound. Unwanted noises include, but are not limited to, background noises, multiple voices from a single digital audio source, and any other noises that interfere with the communication on the teleconference line.

One such unwanted noise is hold music. Hold music may interfere with an ongoing teleconference when a participant places his teleconference connection on hold. By placing the teleconference on hold, the participant may unknowingly initiate hold music onto the teleconference line. In this situation, the teleconference host cannot communicate to the participant that their line is playing hold music and would be forced to mute all lines to allow the teleconference to continue. A drawback to muting all lines is that if the teleconference involved collaborative communication between multiple participants, then participants wishing to speak would have to unmute themselves one-by-one before speaking.

In one embodiment, a solution to the problem of unwanted noise is to determine which particular digital audio source is creating unwanted noise, then presenting the noise level of each participant to the other participants. By having each participant's noise level presented to all other participants, an embodiment may be able to quickly notify the offending participant through an online interface that their noise level is disruptive to the ongoing communication.

2.0 Structural and Functional Overview

In an embodiment, a noise index engine comprises a special purpose computer, one or more computer programs or other software elements, or computer-implemented logic that is configured to determine a level of unwanted noise from a digital audio signal from a digital audio source. The digital audio source in this context includes any digital audio that is received at the noise index engine, or a server computer system, teleconference control computer or call bridge for the particular teleconference. A call bridge may include hardware equipment used to connect calling participants onto one teleconference line. The digital audio source may include any sound detected by a participant's microphone or telephone receiver and provided to the server computer system, teleconference control computer or call bridge directly or indirectly through a telephone or voice network such as the PSTN or VOIP network. The participant's microphone or telephone receiver, used during the current teleconference, receives analogue sound waves from the participant and any other analogue sound waves present in the participant's location, such as background noise. The microphone or telephone receiver then converts the analogue sound wave into an electrical signal, which is then converted into digital audio signal by an analogue-to-digital converter. The digital audio source represents the sounds detected by the participant's microphone or telephone receiver which is then converted from an analogue signal to a digital signal.

The noise index engine calculates a noise index level. The level calculated by the noise index engine is hereby referred to as the noise index value. In an embodiment, the noise index value may be a calculation of two or more sounds identified from the particular digital audio signal. Parsing out two or more sounds from the particular digital audio signal may be accomplished using noise evaluation functions, algorithms, processes or technologies to recognize different types of sounds. The noise evaluation technologies may then parse the digital audio signal into two or more categories including, but not limited to, human voice, two or more human voices, background noises, and an actionable sound. Once the possible types of sounds are identified and evaluated, the noise index engine calculates an overall noise index value and presents that value to the other participants.

Embodiments of the noise index value presentation include, but are not limited to, a user interface that displays a roster list of participants attending the current teleconference. The roster list display may include details for each participant including their current noise index value. The purpose to displaying each participant's noise index value on the roster list is that if any unwanted noise is detected from a particular digital audio source, the corresponding participant may then be easily identified by other participants based on the displayed noise index value for that corresponding participant.

The location of the noise index engine may vary depending upon whether the online teleconference system is utilizing the public switched telephone network (PSTN) or a voice over internet protocol (VOIP) connection. In a PSTN embodiment, participants using PSTN for an online teleconference may call a specific teleconference phone number and the PSTN would bridge calls from the participants together onto one shared line so that the participants can communicate with each other. In addition to the telephone connection, participants may connect to an online meeting server in order to participate with any online portion of the teleconference. The online meeting server satisfies all teleconference needs other than the audio communication including, but not limited to, a visual presentation and interactive multimedia tools.

Figure 1:
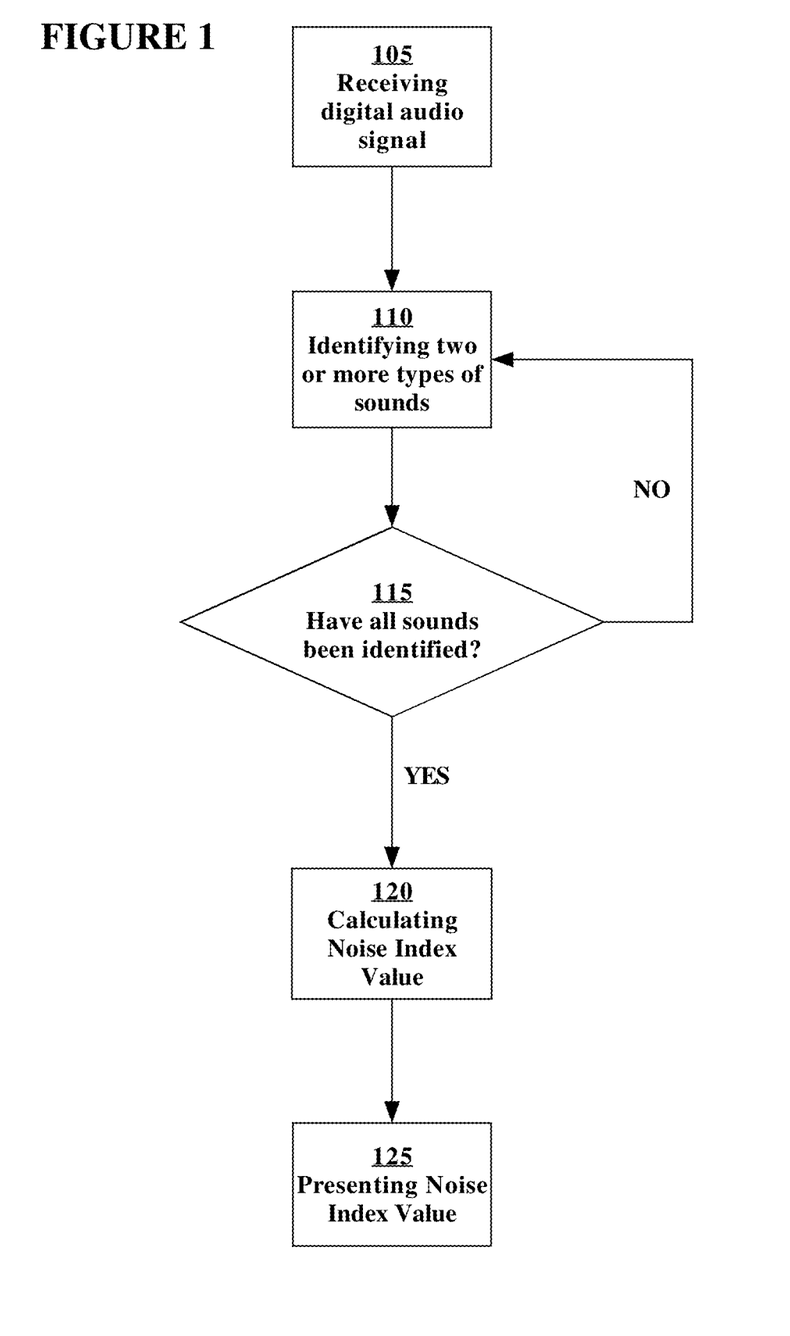
FIG. 1 illustrates an approach for receiving the digital audio signal, determining and presenting a noise index value to teleconference participants.
Figure 2:
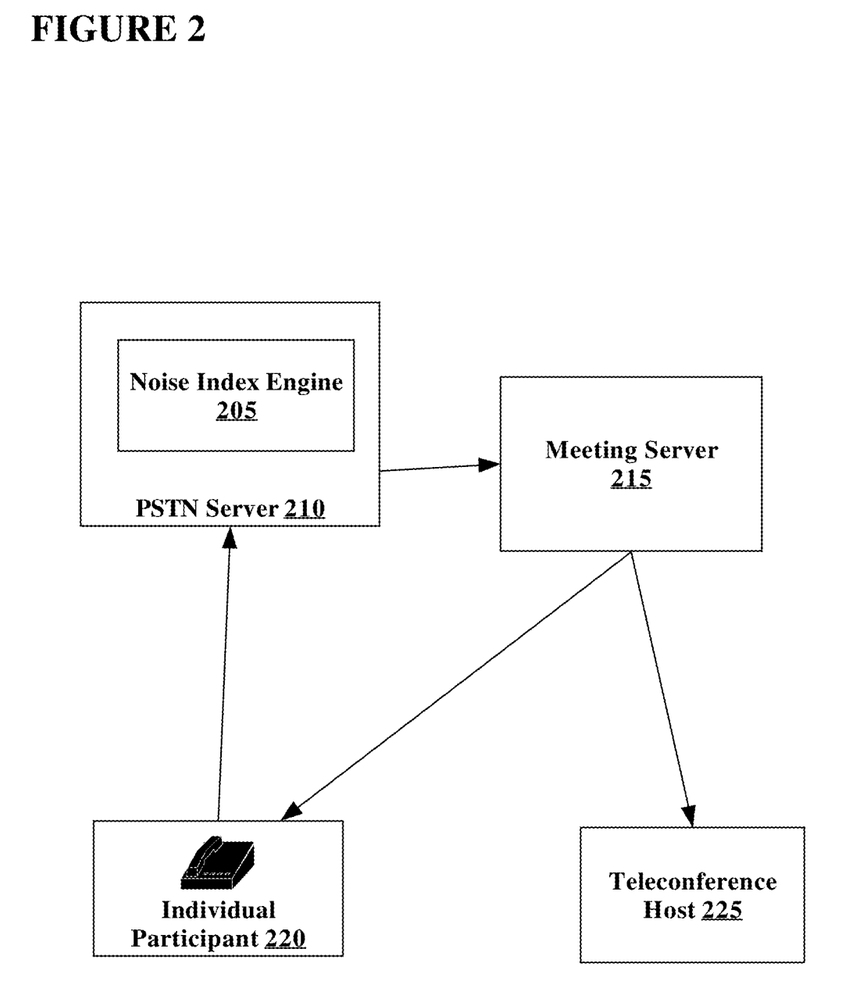
FIG. 2 illustrates an embodiment of a teleconference system using a public switched telephone network server.

FIG. 1 illustrates an approach for receiving the digital audio signal, determining and presenting a noise index value to teleconference participants. FIG. 2 is an embodiment of an online teleconference using the PSTN for digital audio communication. Referring first to FIG. 2, in one embodiment, a noise index engine 205 is located on a PSTN server 210, which is coupled to a meeting server 215. One or more individual participants 220 using phones may establish call connections to PSTN server 210, and meeting server 215 may establish connections to the individual participants 220 and to a teleconference host 225.

In this scenario, the PSTN server 210 acts as a call bridge interface by connecting calling participants onto one teleconference line. When the noise index engine 205 is within the PSTN server 210, the noise index engine is able to calculate noise index values for each participant during the teleconference because all digital audio signals are communicated through the PSTN server 210.

Once the noise index engine 205 calculates the noise index value, the noise index engine 205 sends the values for each participant to the meeting server 215. As discussed previously, the meeting server 215 is used to communicate all information, except audio, to all participants. This includes the noise index values of all participants. Therefore all participants, including the teleconference host, will be able to know which noise index values for particular participants reach an unacceptable level. FIG. 2 depicts the transmission of the noise index values from the meeting server 215 to each of the individual participants 220 and the teleconference host 225. The noise index values are presented in the context of the participant's computer running a client user interface of an audio conference manager.

Figure 3:
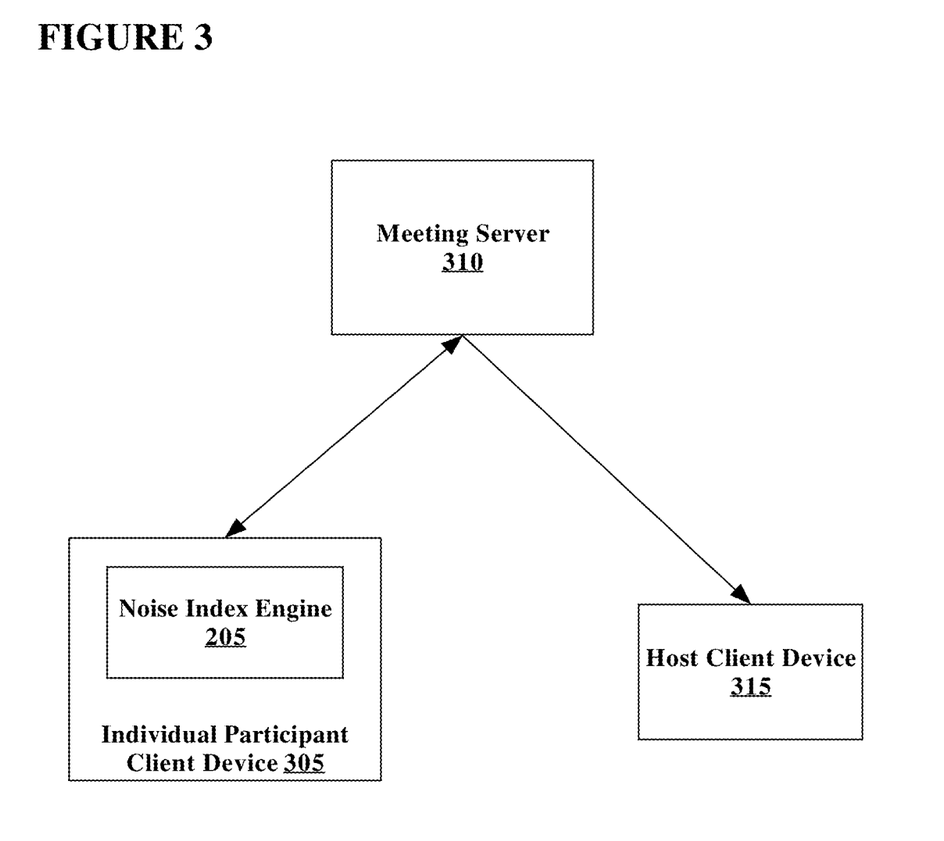
FIG. 3 illustrates an embodiment of a teleconference system using voice over internet protocol.

FIG. 3 illustrates an embodiment of a teleconference system using voice over internet protocol. In an embodiment, a meeting server 310 is coupled to an individual participant client device 305 that hosts or executes the noise index engine 205; the meeting server 310 is also coupled to a host client device 315.

FIG. 3 depicts a scenario where VOIP is used to communicate audio instead of PSTN. In this scenario, each individual participant orally communicates using a client device, such as a computer. The individual participant client device 305 communicates the participant's digital audio signal directly to the meeting server 310. In this embodiment, the meeting server 310 operates as a call bridge interface by connecting all participants onto on teleconference session. Rather than using the PSTN server 210 of FIG. 2, the noise index engine 205 is hosted directly on the individual participant client device 305. When the noise index engine 205 is on the individual participant client device 305, the noise index engine 205 is able to determine the noise index value for the particular participant locally.

The noise index value is then sent, along with the digital audio signal to the meeting server 310. The meeting server 310 receives the digital audio and the accompanying noise index value, and then sends the noise index value directly to all of the individual participant client device 305, as well as the host client device 315. The noise index values are presented in the context of the participant's computer running a client user interface of an audio conference manager.

In either scenario, noise index calculation and transmission may be continuous, discontinuous, periodic, or may use other time intervals. For example, the noise index values could be calculated and communicated every one (1) seconds, every 500 milliseconds (ms), or at any other desired time interval, or continuously.

3.0 Noise Index Engine

In an embodiment, the noise index engine 205 may use different voice recognition technologies to identify different types of sounds within the received digital audio input. FIG. 1 depicts one embodiment of an approach for receiving the digital audio signal, determining the noise index value and then presenting to noise index value to other participants.

At step 105, the noise index engine receives the digital audio signal. As described for FIG. 2 and FIG. 3, the digital audio signal may be received directly from a client device or from a client connected to the PSTN server 210.

At step 110, the noise index engine 205 implements different technologies to identify different types of sounds within the digital audio signal. As previously discussed, different types of sounds include, but are not limited to, human voice, two or more human voices, background noises, and an actionable sound.

Step 115 depicts the noise index engine 205 determining whether or not all sounds within the digital audio signal have been identified. If, the noise index engine 205 determines that not all sounds have been identified at step 115, then the noise index engine 205 returns to step 110 to identify the remaining sounds not yet identified. If at step 115 the noise index engine determines that all sounds have been identified, then the noise index engine proceeds to calculating the noise index value.

At step 120, the noise index engine calculates the noise index value. Details of an example for calculating the noise index value are described in other sections herein such as in the section titled DETERMINING THE NOISE INDEX VALUE. After the noise index value has been determined, the noise index engine 205 proceeds to step 125, where it presents the noise index value to the participants. Details of an example for presenting the noise index value are described in other sections herein such as in the section titled PRESENTING THE NOISE INDEX VALUE.

The noise index engine 205 categorizes each type of sound identified into a particular noise category. In an embodiment the different noise categories include, but are not limited to, human voice, background noise, one or more other voices, and actionable sounds.

Once a particular sound is categorized, technologies are used to determine the relative magnitude of each categorized sound. In one embodiment, calculating the relative magnitude of each type of sound may involve first determining the absolute sound strength, and then multiplying the absolute sound strength by a particular weight coefficient to determine the relative magnitude of each categorized sound. The absolute sound strength may be calculated using such properties as wave strength, frequency, and decibel value. The weight coefficient for each type of sound may be different depending on how distracting each sound is. By calculating the relative magnitude of each categorized sound, the noise index engine is able to prioritize certain unwanted sounds over other desired sounds, such that when the overall noise index value reaches a certain level, it reflects a state where unwanted noise from a particular digital audio source may be distracting to other participants.

Figure 4:
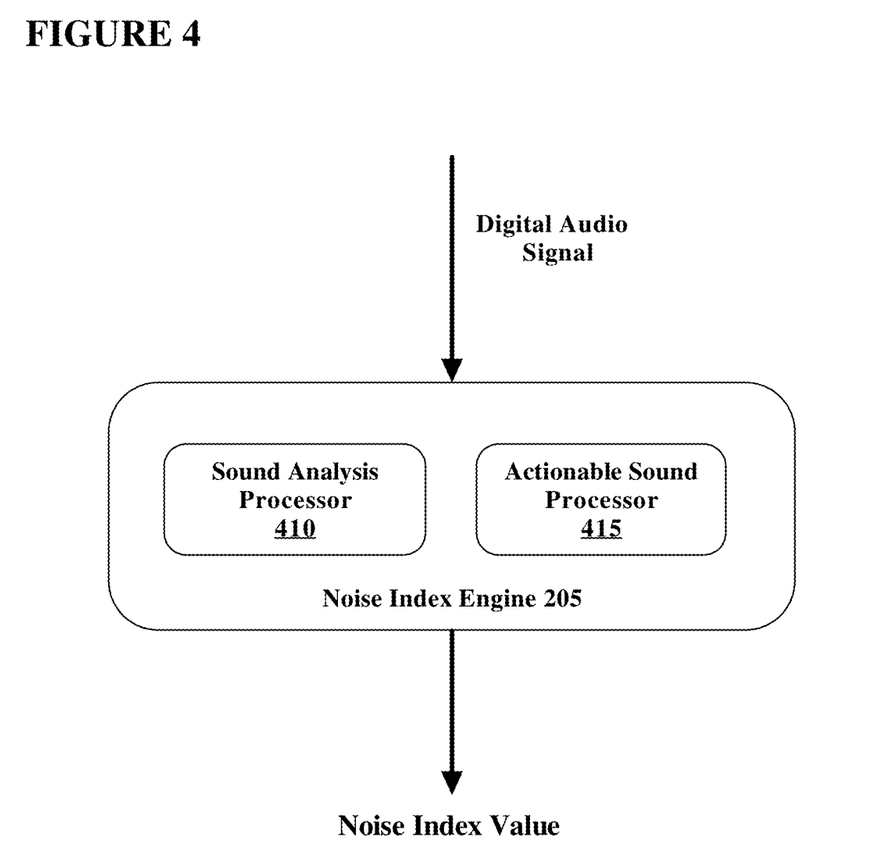
FIG. 4 illustrates an embodiment of a noise index engine.

In an embodiment, the noise index engine 205 may use one or more different processors to categorize the types of sounds. FIG. 4 illustrates an embodiment of a noise index engine. In the example of FIG. 4, a digital audio signal comprises input to the noise index engine 205, which comprises a sound analysis processor 410 and an actionable sound processor 415; these elements cooperate to determine and provide a noise index value as output. Thus FIG. 4 depicts an embodiment in which multiple processors are used to categorize the types of sounds.

In an embodiment, sound analysis processor 410 may be used to identify and calculate relative magnitudes of sounds such as: human voice, one or more voices, and background noise. The actionable sound processor 415 is used to determine whether the particular type of sound matches a sound that has been deemed actionable. Once a sound is identified by the actionable sound processor 415, the relative magnitude is determined. The noise index engine 205 then calculates the noise index value by taking the sum of the relative magnitudes of all categorized sounds.

3.1 Determining the Noise Index Value

A human voice is the sound that occurs when a person speaks. Technologies used by the sound analysis processor 410 are configured to recognize the specific wave and frequency associated with a human voice to categorize a specific sound as human voice; for example, a speech recognition processor, or a digital signal processor programmed with firmware or other instructions to perform speaker-independent voice recognition, may be used as sound analysis processor 410. The sound analysis processor 410 then calculates the absolute sound strength of the human voice and assigns the value to $V_h$. In order to determine the relative magnitude of the human voice, the $V_h$ is multiplied by the human voice weight coefficient, $W_h$. The human voice weight coefficient may be configurable in order to optimize the noise index value so that when a spoken human voice is understandable the noise index value is calibrated to output an acceptable level.

The one or more voices category is used to determine how many different humans are speaking during an instance of a human voice. This determination is especially useful because if in one digital audio signal multiple people are talking at once, then it is likely difficult for a listening participant to understand one of the multiple voices speaking. Technologies used by the sound analysis processor 410 determine the number of humans speaking from a single digital audio source. The number of speaking humans, $N_n$, is then multiplied by the configured number of speaking humans weigh coefficient, $W_n$, to determine the relative magnitude of the one or more voices.

Background noise as used herein is noise that is anything but human voice. Technologies used by the sound analysis processor 410 to recognize a human voice may also be used to determine when the specific sound is not a human voice. This specific sound is then categorized as background noise. The sound analysis processor 410 uses wave strength and sound frequency to determine the absolute sound strength of the background noise as Vb. The configured background noise weight coefficient, Wb, is used with the background noise absolute sound strength, Vb, to determine the relative magnitude of the background noise.

The actionable sound category is a specific category whereby the actionable sound processor 415 matches the particular sound from a digital audio signal to a predetermined list of actionable sounds. The purpose of having an actionable sound category is to recognize pre-identified sounds, which may be particularly distracting. These pre-identified sounds are given special weight when determining the overall noise index value.

In an embodiment the actionable sound processor 415 can be configured to store a set of actionable sounds. Configuration may include, but is not limited to, storing previously identified sounds, such as particular hold music, certain ring tones, or any noise identified as distracting. The actionable sound processor 415 receives the same digital audio signal as the sound analysis processor 410, and compares the digital audio signal to the pre-identified stored sounds. If there is a match, then the actionable sound processor 415 determines the absolute sound strength of the actionable sound as Vr. The relative magnitude of the actionable sound is then calculated by multiplying the Vr by the actionable sound weight coefficient, Wr.

The noise index value, "Ni" is calculated as the summation of the relative magnitudes of all categorized sounds identified as shown, for example, in the following expression:

$$Ni=Vb*Wb+Nn*Wn+Vh*Wh+Vr*Wr$$

Weight coefficients for each categorized sound may be configured depending on how distracting each sound is. For example, the weight coefficient for a very distracting actionable sound, Wr, may be set as a high value. Therefore even if the absolute sound strength, Vr, of the actionable sound is low, once multiplied by the weight coefficient, Wr, the relative magnitude of the actionable sound will have a significant effect on the overall noise index calculated.

Similarly, configuring a low human voice weight coefficient, Wh, may be desirable because the purpose of the noise index value is to identify when a particular digital audio source may be distracting others on the teleconference. The calculated relative magnitude of the participant's human voice (Vh*Wh) should not have a significant effect on the overall noise index because when a human voice is identified it is likely that the participant speaking is attempting to communicate with others on the teleconference.

Depending on the value of the noise index value, the noise index engine 205 may be configured to perform different actions.

3.2 Categorizing the Noise Index Value

In an embodiment, different levels for the noise index value may be defined. The purpose of defining one or more noise index levels is so that different actions may be triggered based on the level. The noise index levels configured may include, but are not limited to, a weak level, a warn level, and a serious level.

The weak level may be defined as a low noise index value level which is likely not to disturb the ongoing teleconference communication, therefore not requiring any alerts or actions.

The warn level may be defined as a noise index value level sufficiently high enough so as to be a potential disturbance to the ongoing teleconference communication. Embodiments of the warn level may prompt the noise index engine 205 to send an alert to the offending participant and the teleconference host. Other embodiments may alert all participants of the detected warn level of a particular participant.

The serious level may be defined as a noise index value level that is sufficiently high enough so as to be a disturbance to other listening participants. Embodiments of the serious level may trigger the noise index engine 205 to send an alert all participants of the serious level and mute the offending participant. Embodiments of the automatic muting functionality may also continue to monitor the serious level of the noise index value so that when the noise index value falls below the serious level threshold the offending participant is automatically unmuted.

Other embodiments of the serious level functionality may also include a duration threshold whereby the offending participant is not deemed to be at a serious level until the participant's noise index value stays above the serious level for a specific amount of time. The purpose of implementing a duration threshold is to ensure that certain transient events that rise above the serious threshold do not trigger alerts or action from the noise index engine 205. Examples of transient events may include but are not limited to brief bursts laughter, brief applause, brief coughing, or a sneeze.

3.3 Presentation of the Noise Index Value

In an embodiment, the noise index value is visually presented to each participant on their corresponding client computer that is running an audio conference manager or an online teleconference interface. Embodiments of a participant's computer may include, but are not limited to, a personal computer, tablet, mobile phone, or other computer. Embodiments of an audio conference manager or an online teleconference interface may include, but are not limited to, a user interface screen display of a program such as WEBEX, commercially available from Cisco Systems, Inc., San Jose, Calif.

In an embodiment, the audio conference manager comprises a server component and a client component. The server component may include a controller unit which manages data between each connected client component. In an embodiment, the server component of the audio management program is located on the meeting server 310. The client component of the audio conference manager displays a graphical user interface to each participant and communicates with the server component. In an embodiment, the client component of the audio conference manager is located on individual participant client device 305.

In an embodiment, the server component located on the meeting server 310 sends each client component display information including, but not limited to, a participant roster list displaying of all participants by name, email address, profile picture, or phone number and their corresponding noise index value. The purpose of presenting the current noise index values, alongside the corresponding participants, on the roster list is efficient identification of certain participants that may be the source of the distracting noise. Embodiments of presenting the current noise index value may include, but are not limited to, different shapes, colors, and numerical values.

Figure 5:
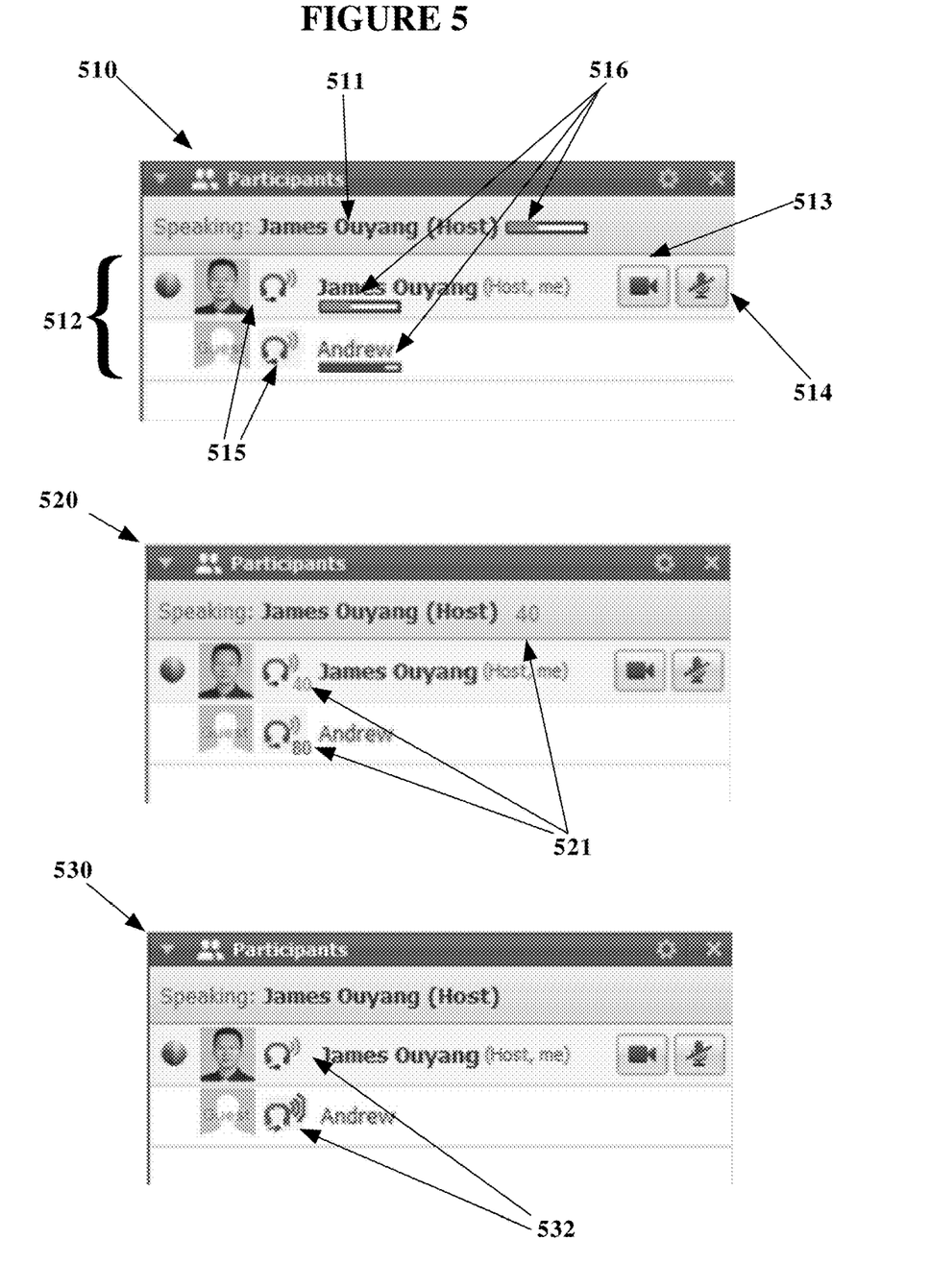
FIG. 5 illustrates various presentation methods for a noise index value.

FIG. 5 illustrates various presentation methods for a noise index value on the participant roster list.

In one embodiment, a first display 510 represents a user interface displayed on a client device. The first display 510 displays the current roster of attending participants on the current conference call as well as which particular participant is currently speaking. The name current speaking participant 511 is displayed in the top row of the first display 510. The current roster list 512 is listed in a vertical row format under the speaking participant 511. Within each row of the roster list 512, a video button 513 may be displayed indicating whether the participant has video conference capabilities. A mute button 514 may be displayed to indicate whether a participant is currently muted or whether a participant has the ability to mute oneself or other participants. A headset icon 515 may be displayed next to each participant's name in order to indicate whether the noise index engine 205 is receiving a digital audio signal from a particular participant. Curved wave lines may appear next to the headset icon when the noise index engine 205 detects a digital audio signal. In one embodiment, the noise index value is displayed using graphical bar 516, where the amount of shading in the bar and the bar color indicate whether the noise index value level is either weak, warn, or severe. For instance, if the noise index value for a particular participant was within the warn level then the graphical bar may turn an orange color so that it would be easily recognizable by the particular participant and other participants. Other embodiments may include a green graphical bar indicating the noise index value is acceptable and within the weak level category, and a red graphical bar indicating the noise index value is exceeds the severe level category threshold. The graphical bar 516 may be displayed next to the participant's name, when the participant is speaking, as well as under the participant's name within the roster list 512. The graphical bar 516 representing each participant's noise index value is displayed within the roster list.

In another embodiment, a second, different display 520 depicts the noise index value with a numerical representation 521. The numerical representation 521 is the numerical value of the noise index value for a particular participant. The numerical representation 521 indicates the noise index value on a scale of 0 to 100. The color of the numerical representation 521 changes depending on whether the noise index value was either weak, warn, or severe. For instance the numerical representation 521 may be colored green when the noise index value is within the weak level category, orange when the noise index value is within the warn level category, and red when the noise index value is within the severe level category. By using the numerical representation 521 along with color changes, each participant is able to quickly identify and understand the exact noise index value from each of the participants.

In another embodiment, a third, different display 530 depicts the noise index value as a graphical representation of sound waves 532, where the size and shape of the sound wave and the color change depending on whether the noise index value was either weak, warn, or severe. The size of the sound waves 532 are represented by the number of curved wave lines. For instance, if the noise index value was low then the sound waves 532 would only show one or two curved wave lines. If however, the noise index value was within the warn or severe level category, then the sound waves 532 may display three curved waves for warn and four curved waves for severe. Similarly, the color of the sound waves 532 may depict the level category where: green may indicate a weak level, orange may indicate a warn level, and red may indicate a severe level. Other embodiments may use different colors to depict the different level categories.

The purpose of presenting the noise index value in different ways is that each participant may prefer a different presentation method depending on different factors such as limitations on the client device and personal display preference.

Displays 510, 520, 530 represent alternatives that may be used alone or together in the user interface of the client component of the audio conference manager, in various embodiments. Embodiments of a system alert presentation may include, but are not limited to: pop-up notifications on the offending participant's online teleconference interface; pop-up notifications on the teleconference host's online teleconference interface; or pop-up notifications of the noise index engine 205 automatically muting or automatically unmuting an offending participant's microphone.

In an embodiment, if a participant's noise index value level reaches the warn level, the noise index engine 205 sends an alert to the participant's client computer resulting in a pop-up message, on the participant's online teleconference interface, to notify the participant that the noise index engine 205 detects that the noise from their microphone may be distracting to other participants. By presenting a pop-up message on the participant's user interface, the user is more likely to become aware of the severe noise index level rather than having to constantly monitor the values on the roster list. Embodiments of the pop-up message may display possible options to the participant to reduce the detected noise including, but not limited to, an option to mute the participant's microphone, a suggestion to move to a quieter place, or alert the user to stop the distracting noise.

Other embodiments of the pop-up notification may include, but are not limited to, notifying the teleconference host about the noise level on the offending participant's microphone. The teleconference host may then have the option of further notifying the offending participant or remotely muting the offending participant's microphone.

Other embodiments of the pop-up notification may also include notifying the offending participant and the teleconference host or automatically muting the offending participant when the noise index value level reaches a severe level.

In an embodiment the notification and muting rules may be configurable by a teleconference administrator, teleconference host, or particular attendees.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
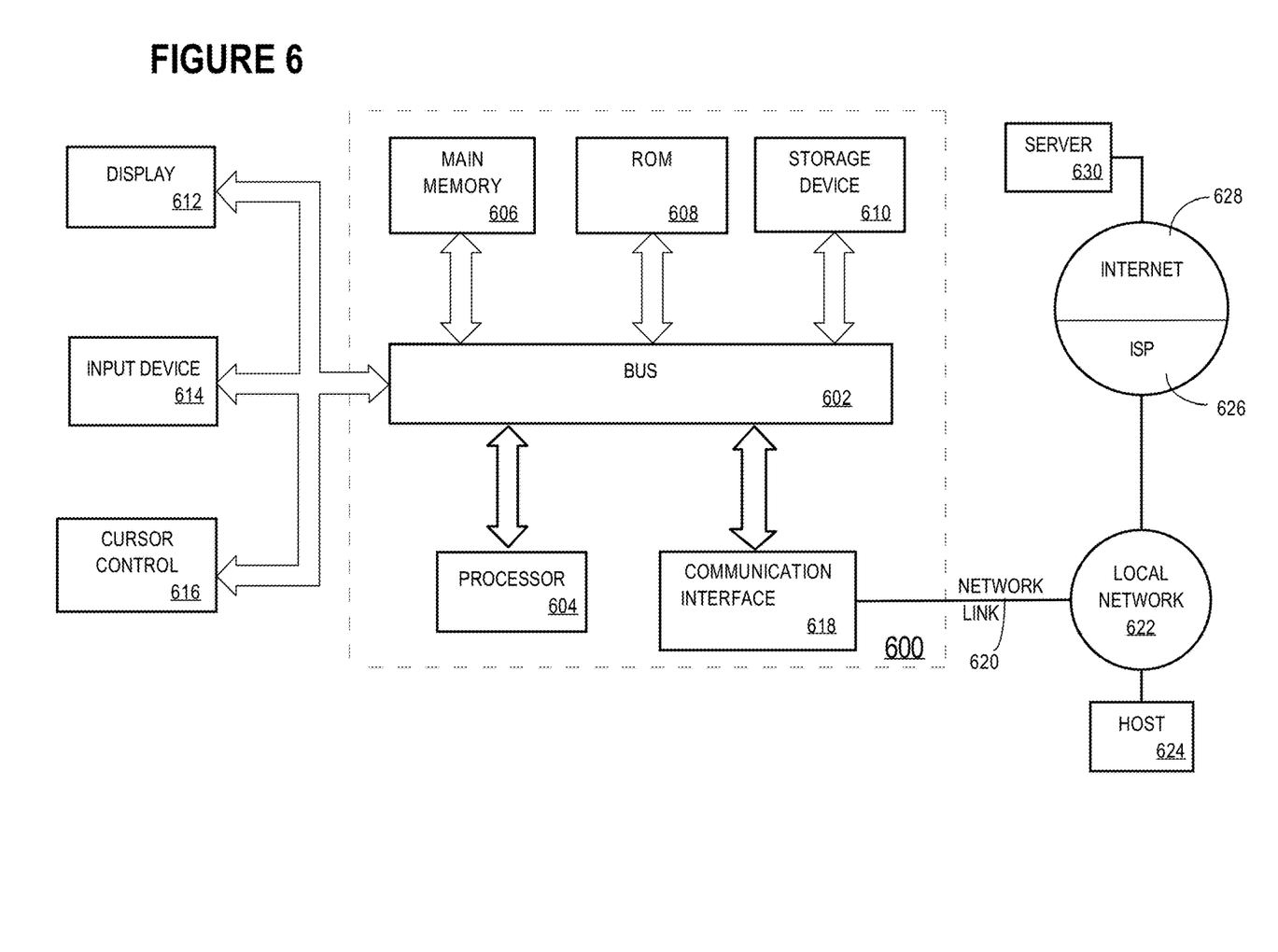
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for calculating a noise index value for a digital audio source of a plurality of digital audio sources in a teleconference comprising:
   in a server computer system that is coupled to the plurality of digital audio sources and configured to operate the teleconference among the plurality of digital audio sources, receiving a first digital audio signal from the digital audio source of the plurality of digital audio sources;
   using the server computer system, identifying two or more types of sounds that are represented in the first digital audio signal, wherein the two or more types of sounds identified include: one or more human voices and an actionable sound that mandates further action, wherein the actionable sound is not a human voice;
   for each of the two or more types of sounds, determining a relative magnitude by determining an absolute sound strength and applying a weight coefficient associated with the type of sound to the absolute sound strength;
   using the server computer system, calculating the noise index value based upon the two or more types of sounds identified from the first digital audio, wherein the noise index value represents a summation of the relative magnitudes of the two or more types of sounds;
   visually presenting the noise index value to two or more client computers of the plurality of digital audio sources in a user interface screen display of an audio conference manager that the two or more client computers execute.

2. The method of claim 1 wherein the type of sound identified is background noise.

3. The method of claim 1 wherein the type of sound identified is the actionable sound.

4. The method of claim 1 wherein one or more attributes of the actionable sound are specified in configuration data.

5. The method of claim 1 wherein presenting the noise index value to the one or more digital audio sources comprises displaying the value of the noise index value to one or more digital audio sources.

6. The method of claim 5 wherein presenting the noise index value to the one or more digital audio sources further comprises creating and displaying an alert indication to the one or more digital audio sources if the noise index value reaches a particular threshold.

7. The method of claim 6 wherein creating and displaying the alert indication comprises ignoring periods where the noise index value reaches the particular threshold momentarily and then the noise index value falls below the particular threshold.

8. The method of claim 5 wherein presenting the noise index value to the one or more digital audio sources further comprises automatically muting the digital audio source if the noise index value of the digital audio source reaches a particular threshold.

9. The method of claim 8 wherein muting one or more digital audio sources if the value of the noise index value of the digital audio source reaches a particular threshold comprises ignoring periods where the noise index value reaches the particular threshold momentarily and then the noise index value falls below the particular threshold.

10. The method of claim 5 wherein presenting the noise index value to the one or more digital audio sources further comprises automatically unmuting a muted digital audio source if the noise index value of the digital audio source falls below a particular threshold.

11. The method of claim 1, wherein the noise index value is presented using a graphical bar or curved wave lines.

12. A teleconference control computer, comprising:
    a call bridge interface unit that is configured to couple to a plurality of digital audio sources and to bridge the digital audio sources in a teleconference;
    receiving logic in the call bridge interface unit that is configured to receive a first digital audio signal from one of the plurality of digital audio sources;
    a noise index computing unit that is configured to:
    identify two or more types of sounds that are represented in the first digital audio signal, wherein the two or more types of sounds identified include: one or more human voices, and an actionable sound that mandates further action, wherein the actionable sound is not a human voice;
    for each of the two or more types of sounds, determine a relative magnitude by determining an absolute sound strength and applying a weight coefficient associated with the type of sound to the absolute sound strength;
    to calculate a noise index value based upon the two or more types of sounds identified from the first digital audio, wherein the noise index value represents a summation of the relative magnitudes of the two or more types of sounds; a presentation unit that is configured to visually present the noise index value to two or more client computers of the plurality of digital audio sources in a user interface screen display of an audio conference manager that the two or more client computers execute.

13. The teleconference control computer of claim 12, wherein one or more attributes of the actionable sound are specified in configuration data.

14. The teleconference control computer of claim 12, wherein the presentation unit that is configured to visually present the noise index value to one or more client computers of the one or more digital audio sources further configured to display the value of the noise index value to one or more digital audio sources.

15. The teleconference control computer of claim 14, wherein the presentation unit that is configured to visually present the noise index value to one or more client computers of the one or more digital audio sources further configured to create and display an alert indication to the one or more digital audio sources if the noise index value reaches a particular threshold.

16. The teleconference control computer of claim 15, wherein creation and display of the alert indication comprises instructions for ignoring periods where the noise index value reaches the particular threshold momentarily and then the noise index value falls below the particular threshold.

17. The teleconference control computer of claim 14, wherein the presentation unit that is configured to visually present the noise index value to one or more client computers of the one or more digital audio sources further configured to automatically mute the digital audio source if the noise index value of the digital audio source reaches a particular threshold.

18. The teleconference control computer of claim 17, wherein the presentation unit that is configured to automatically mute one or more digital audio sources if the value of the noise index value of the digital audio source reaches a particular threshold comprises ignoring periods where the noise index value reaches the particular threshold momentarily and then the noise index value falls below the particular threshold.

19. The teleconference control computer of claim 14, wherein the presentation unit that is configured to visually present the noise index value to one or more client computers of the one or more digital audio sources further configured to automatically unmute a muted digital audio source if the noise index value of the digital audio source falls below a particular threshold.

20. The teleconference control computer of claim 12, wherein the noise index value is presented using a graphical bar or curved wave lines.

\* \* \* \* \*